No. 737,960. PATENTED SEPT. 1, 1903.
G. W. POWELL.
PUNCH OR BLOW TESTING MACHINE.
APPLICATION FILED MAY 2, 1903.
NO MODEL. 3 SHEETS—SHEET 1.
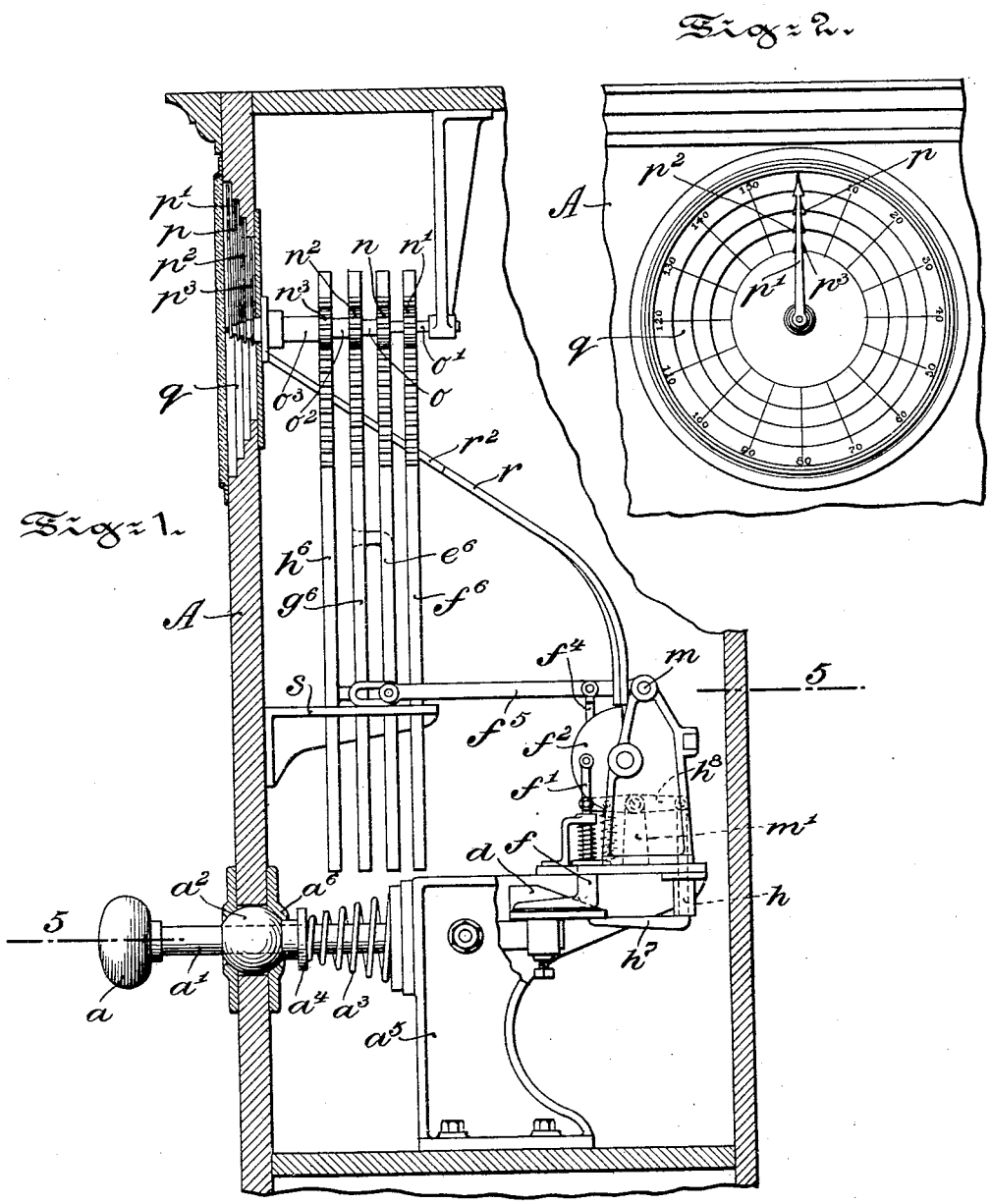
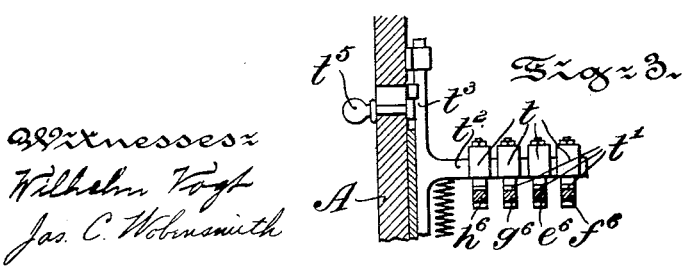

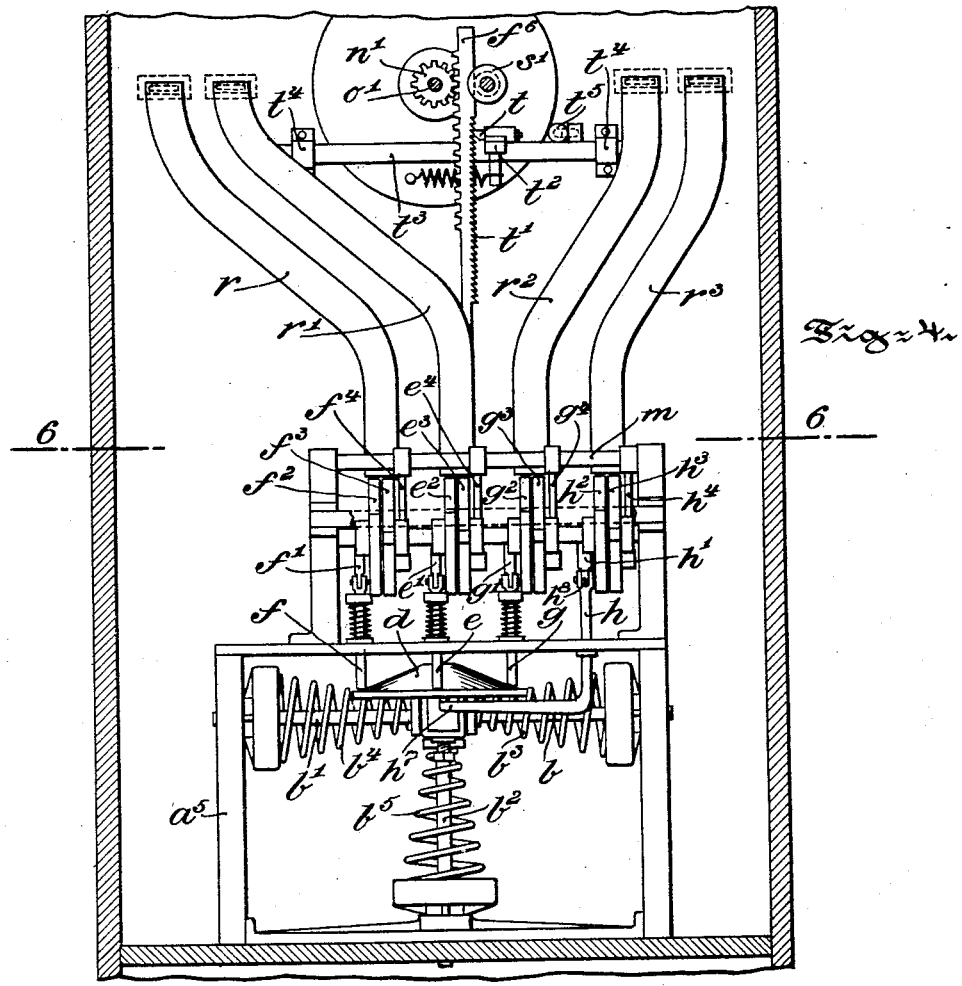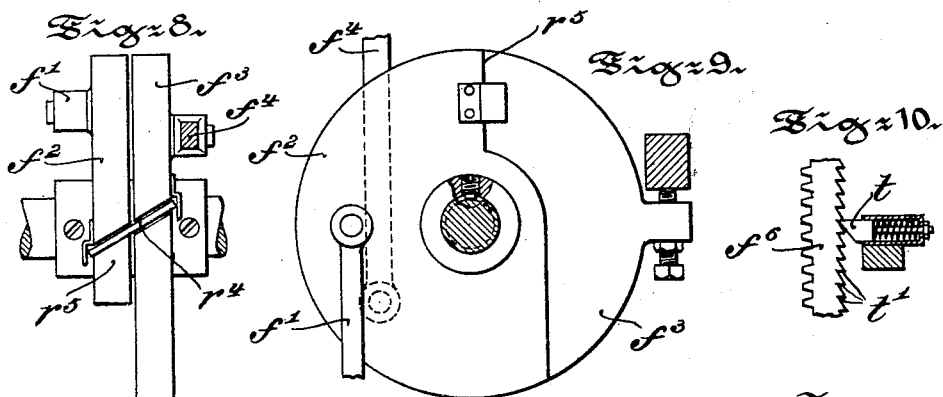

No. 737,960. PATENTED SEPT. 1, 1903.
G. W. POWELL.
PUNCH OR BLOW TESTING MACHINE.
APPLICATION FILED MAY 2, 1903.
NO MODEL. 3 SHEETS—SHEET 3.
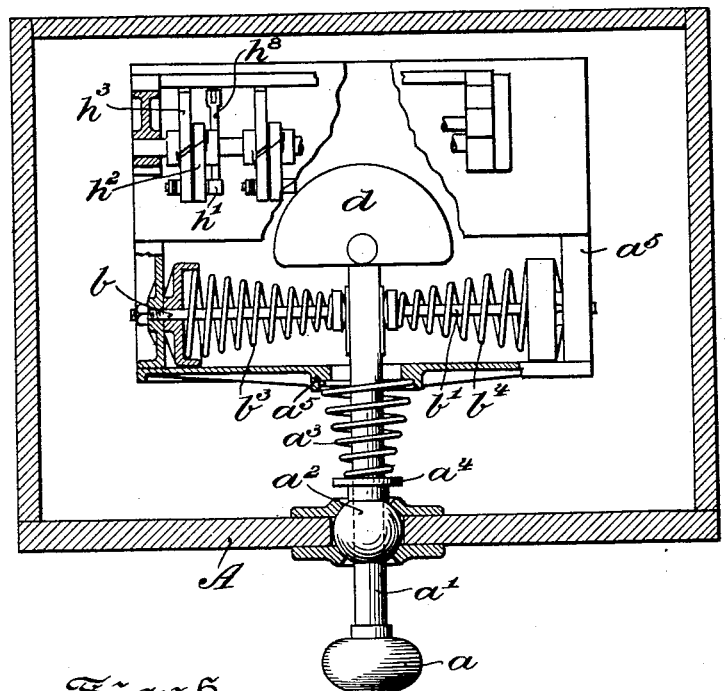
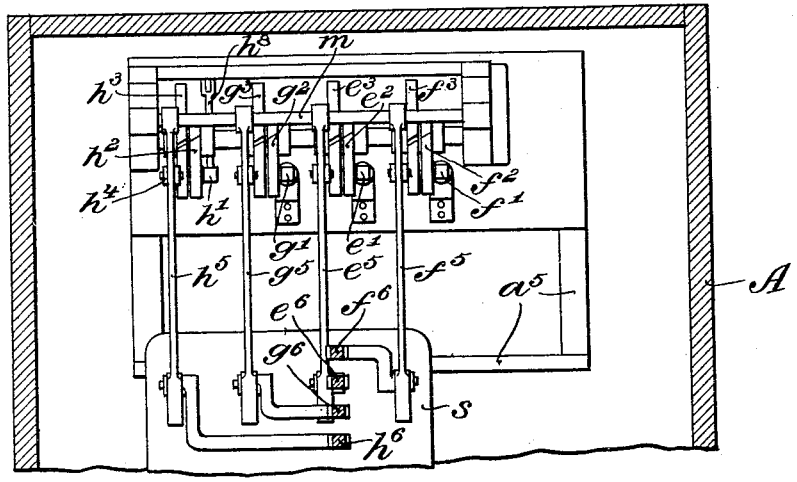
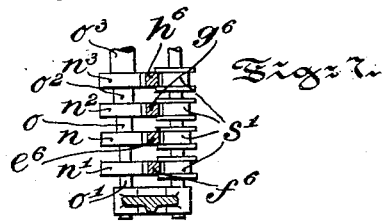

No. 737,960. Patented September 1, 1903.

UNITED STATES PATENT OFFICE.

GEORGE W. POWELL, OF PHILADELPHIA, PENNSYLVANIA.

PUNCH OR BLOW TESTING MACHINE.

SPECIFICATION forming part of Letters Patent No. 737,960, dated September 1, 1903.

Application filed May 2, 1903. Serial No. 155,245. (No model.)

*To all whom it may concern:*

Be it known that I, GEORGE W. POWELL, a citizen of the United States, residing at the city of Philadelphia, in the county of Philadelphia and State of Pennsylvania, have invented certain new and useful Improvements in Punch or Blow Testing Machines, of which the following is a specification.

My invention has relation to a machine for receiving and registering the force of a blow delivered upon a bag or punching-head projecting from the front of the casing of the machine; and in such connection it relates to the arrangement and construction of such a machine whereby blows of varying force and direction may be received and accurately registered.

Heretofore in blow-testing or punching machines the head or bag was capable of receiving only a straight blow and registered the force of such a blow. In pugilistic sport, however, many other well-recognized blows are used—such, for instance, as the left-hand lead or blow, the right-hand lead or blow, and the upper cut or blow delivered upward upon the antagonist.

To accurately determine the force of the direct as well as the other well-known blows is the principal object of my present invention.

The nature and scope of my invention will be more fully understood from the following description, taken in connection with the accompanying drawings, forming part hereof, in which—

Figure 1 is a vertical sectional view of a blow testing and registering machine embodying main features of my present invention. Fig. 2 is a front view of the dials and pointers which register the force of the several blows. Fig. 3 is a detail view illustrating the means for releasing the pointer-operating mechanisms and permitting the same to return to normal position. Fig. 4 is a rear elevational view of the machine, the casing being shown in vertical section. Fig. 5 is a horizontal sectional view of the machine, taken on the line 5 5 of Fig. 1, certain parts being broken away for clearness of illustration. Fig. 6 is a horizontal sectional view taken on the line 6 6 of Fig. 4. Fig. 7 is a detail view illustrating the racks, the pinions and shafts operated by said racks, and the guide-rollers which permit the racks to slide vertically in the machine. Fig. 8 is an enlarged detail view illustrating in plan the means for controlling the registering of a blow through the medium of a coin. Fig. 9 is a side elevational view of Fig. 8, and Fig. 10 is an enlarged detail view of a detent for locking one of the racks in its raised position.

Referring to the drawings, $a$ represents the punching head or bag, supported upon one end of a stem $a'$ of preferably tubular shape. The stem $a'$ traverses a ball-and-socket bearing $a^2$, formed in the casing A of the machine, and is normally prevented from sliding inward through the bearing $a^2$ by means of a spring $a^3$, interposed between a collar $a^4$ on the stem $a'$, and a fixed frame $a^5$, arranged within the casing A. The head $a$ and its stem $a'$ is thus permitted to slide horizontally inward through the ball-and-socket bearing $a^2$ when pressed or struck with sufficient force to overcome the tension of the spring $a^3$. The head $a$ and stem $a'$ may also oscillate from right to left, or vice versa, the bearing $a^2$ turning with the stem $a'$. The head $a$ may also ride upward when struck from below, in which instance the head $a$ and stem $a'$ also turn with the bearing $a^2$.

The frame $a^5$ forms a bearing or support for the bolts $b$, $b'$, and $b^2$, which are respectively provided with heads normally thrown into engagement with the inner end of the stem $a'$ by means of the springs $b^3$, $b^4$, and $b^5$. Of these springs and bolts the bolt $b^2$, with its spring $b^5$, tends to throw the inner end of the stem $a'$ upward and to oppose, therefore, a movement of the head or bag $a$ in response to a blow struck upward on the bag or, as is known, an "upper cut." A lug or flange $a^6$ upon the socket portion of the bearing $a^2$ serves as a stop to prevent the inward end of the stem $a'$ from being thrown upward beyond a horizontal or operative position. The springs $b^3$, $b^4$, and $b^5$ oppose the movement of the stem $a'$ when the head or bag $a$ is struck to respond to a left-hand, right-hand, or upper-cut blow. The spring $a^3$ opposes the inward movement of the stem $a'$ when the head or bag $a$ is struck to respond to a direct blow.

The registration of the force of each blow delivered is obtained by the following preferred means: On the inner end of the stem $a'$ is carried a frusto-conical plate $d$, which has its inclined surface resting under three vertical arms $e$, $f$, and $g$. These arms are held down under spring tension upon the surface of the plate $d$, as clearly illustrated in Fig. 4. To the upper end of each arm $e$, $f$, or $g$ is pivotally secured one end of a link $e'$, $f'$, or $g'$, the other end of said link being pivoted to the face of a disk $e^2$, $f^2$, or $g^2$. Adjacent to each disk $e^2$, $f^2$, or $g^2$ is a second disk $e^3$, $f^3$, or $g^3$, arranged to turn with its companion disk when the same is operated by an arm $e$, $f$, or $g$. On the face of each second disk $e^3$, $f^3$, or $g^3$ is pivoted one end of a link $e^4$, $f^4$, or $g^4$, the other end of the link being pivoted to a lever-arm $e^5$, $f^5$, or $g^5$. All the arms $e^5$, $f^5$, and $g^5$ have a common fulcrum—namely, a transverse rod $m$—and the free end of each of the arms $e^5$, $f^5$, and $g^5$ is in slotted connection with a corresponding rack $e^6$, $f^6$, or $g^6$, as clearly illustrated in Figs. 1, 4, and 6. The three arms $e$, $f$, and $g$, which rest upon the conical or inclined surface of the plate $d$, thus transfer the movement of said plate $d$, and therefore of the stem $a'$, to a corresponding rack $e^6$, $f^6$, or $g^6$, when the bag or head $a$ is forced directly inward or to the right or to the left. To register the movement of the bag or head $a$ upward, a slightly-different mechanism is required. In this instance the under or flat face of the plate $d$ rests upon a shoe $h^7$, projecting from an arm $h$. This arm $h$ is connected at its upper end to one end of a lever-arm $h^8$, pivoted intermediate of its ends in a bracket $m'$. The other end of the arm $h^8$ is normally held down under spring tension and is pivotally secured to one end of a link $h'$, the other end of said link being pivoted to the face of a disk $h^2$. This disk $h^2$ is thus adapted to be turned when the shoe $h^7$ and arm $h$ are depressed and conveys its motion to an adjacent disk $h^3$. This disk $h^3$ operates through a link $h^4$ a lever-arm $h^5$, turning upon the fulcrum $m$, and the free end of the arm $h^5$ is in slotted connection with a rack $h^6$. It follows that when the plate $d$ is forced downward by a blow exerted upward on the head or bag $a$ the force of said blow is transferred through the disks $h^2$ and $h^3$ and intermediate connections to the rack $h^6$. Each rack $e^6$, $f^6$, $g^6$, or $h^6$ meshes with a pinion $n$, $n'$, $n^2$, or $n^3$, secured, respectively, to a shaft $o$, $o'$, $o^2$, or $o^3$, carrying a pointer $p$, $p'$, $p^2$, or $p^3$. In the form of machine shown in the drawings one dial $q$ is used, and the pointers $p$, $p'$, $p^2$, or $p^3$ are arranged on nested or concentric shafts, so that each pointer may indicate upon the common dial $q$ the extent of movement of a pinion $n$, $n'$, $n^2$, or $n^3$ when the proper rack has been raised by the force of the blow exerted upon the punching-head. The racks $e^6$, $f^6$, $g^6$, and $h^6$ are guided in a bracket $s$ and by a series of guide-rolls $s'$, as clearly illustrated in Figs. 1, 4, and 7. The racks are free to drop by gravity, but are sustained in their raised position by spring-controlled detents $t$ engaging ratchet-teeth $t'$ on the rear of the rack, as illustrated in Figs. 3 and 4. To release the racks from the detents, and to thus permit the racks to resume their normal position under influence of gravity, all the detents $t$ are carried by a cross-piece $t^2$, projecting from a sliding bolt or bar $t^3$. This bolt or bar $t^3$ slides in guides $t^4$, fixed to the inside of the front of the casing A and is operated by a button $t^5$, projecting through a slot in said casing A, so as to be accessible from the front of the machine.

The operation of the machine may be controlled, if desired, by a coin of prescribed denomination inserted in the machine, although in gymnasiums or athletic clubs the machine may be installed to operate without the payment of the prescribed coin. In the drawings the machine is illustrated as coin-controlled, and for this purpose it is furnished with a plurality of coin-chutes $r$, $r'$, $r^2$, and $r^3$. These chutes lead from the front of the casing A to a point directly above the complemental disks $e^2 e^3$, $f^2 f^3$, $g^2 g^3$, and $h^2 h^3$. In the periphery of each disk in the sets is formed a slot or recess, into which the coin $r^4$ drops to lock the disks together, as illustrated in Fig. 8. In this instance a portion of one of the disks $e^2$ or $f^2$, $g^2$ or $h^2$, is cut away, as at $r^5$, so that after the two disks in sets have traveled sufficiently to carry the coin $r^4$ beyond a vertical position the coin will drop out of the connecting-slot upon the return of the disks to their normal position.

In the operation of the machine after a blow has been struck upon the head $a$ its stem $a'$ and plate $d$ will raise the proper arm $e$, $f$, $g$, or $h$ against the tension of its spring. This movement of the arm serves to rotate a disk $e^2$, $f^2$, $g^2$, or $h^2$, and when the proper disk is locked to its complemental disk $e^3 f^3 g^3 h^3$ the proper rack will be elevated to rotate through the proper pinion the shaft and pointer required. When so raised, the rack is locked in elevated position by the detent $t$ until the detent has been released through the shifting of the bolt $t^3$, as heretofore explained. The disk $e^2$, $f^2$, $g^2$, or $h^2$ returns to its normal position by reason of the springs on the arms $e$, $f$, or $g$ or the spring-controlled arm $h^8$. The disks $e^3$, $f^3$, $g^3$, or $h^3$ will be returned to their normal position when the racks drop under the influence of gravity.

Having thus described the nature and objects of my invention, what I claim as new, and desire to secure by Letters Patent, is—

1. In a punch or blow testing machine, a casing, a punching-head projecting outside the casing, a stem carrying the head and traversing the casing, and a ball-and-socket bearing arranged in the casing, said bearing supporting the stem and head and said stem arranged to slide in said bearing.

2. In a punch or blow testing machine, a casing, a ball-and-socket bearing in the front of said casing, a stem traversing the bearing and arranged to oscillate therewith and slide therethrough, and a punching-head fitted to the stem and projecting outside the casing.

3. In a punch or blow testing machine, a casing, a stem projecting horizontally through the front of the casing and arranged to slide inward therein and to oscillate thereon, in combination with springs for opposing the oscillating and inward movements of said stem, means for registering upon the exterior of the casing said oscillating and inward movements of said stem, and a punching-head carried by said stem outside the casing.

4. In a punch or blow testing machine, a punching-head, a casing, a stem supporting the head and traversing the casing, a frusto-conical plate arranged on the inner end of said stem, a ball-and-socket bearing supporting the stem in the casing and arranged to permit the stem to slide inward through said bearing, in combination with means for registering the movements of the stem, said means arranged adjacent to the frusto-conical plate and adapted to be operated directly by said plate.

5. In a punch or blow testing machine, a punching-head, a casing supporting the punching-head, a bearing in said casing for said head, said bearing permitting the head to move upward in a vertical plane, in combination with a stem to which the head is fixed, a plate carried by the inner end of said stem, a shoe arranged beneath said stem, an arm carrying said shoe and arranged to be depressed when the plate and shoe are depressed, two complemental disks arranged to be controlled by the movement of the arm and shoe, and a registering device arranged to be operated by said disks.

6. In a punch or blow testing machine, a casing, a ball-and-socket bearing in said casing, a stem traversing the bearing and arranged to move therewith and slide therethrough, a punching-head fitted to the stem and projecting outside the casing, and arranged to respond to side and upwardly-directed blows combined with means controlled by the stem for registering the movement of the head.

In testimony whereof I have hereunto set my signature in the presence of two subscribing witnesses.

GEORGE W. POWELL.

Witnesses:
J. WALTER DOUGLASS,
THOMAS M. SMITH.